US011958683B1

(12) United States Patent
Desrosiers et al.

(10) Patent No.: US 11,958,683 B1
(45) Date of Patent: Apr. 16, 2024

(54) COLLAPSIBLE CONTAINER WITH NESTED BAGS

(71) Applicants: Christian Nicolas Desrosiers, Little Compton, RI (US); Pierre Beaudreau, Quebec (CA)

(72) Inventors: Christian Nicolas Desrosiers, Little Compton, RI (US); Pierre Beaudreau, Quebec (CA)

( * ) Notice: Subject to any disclaimer, the term of this patent is extended or adjusted under 35 U.S.C. 154(b) by 98 days.

(21) Appl. No.: 16/002,959

(22) Filed: Jun. 29, 2018

(51) Int. Cl.
*B65F 1/06* (2006.01)
*B65D 33/00* (2006.01)

(52) U.S. Cl.
CPC ............ *B65F 1/062* (2013.01); *B65D 33/002* (2013.01); *B65F 2220/101* (2013.01); *B65F 2220/1063* (2013.01)

(58) Field of Classification Search
CPC ................ B65F 1/062; B65F 2220/101; B65F 2220/1063; B65D 33/002
USPC ...... 220/495.06–495.11, 908–908.1; 383/11, 383/33, 35, 37, 119; 248/95, 97, 99, 907
See application file for complete search history.

(56) References Cited

U.S. PATENT DOCUMENTS 2,092,969 A * 9/1937 Gustafson ................. B65F 1/06 220/495.11
2,324,440 A * 7/1943 Tormohlen ................ B65F 1/06 206/499
4,402,452 A * 9/1983 Kupersmit ............... B65D 5/36 229/117.01
4,978,231 A * 12/1990 Ling .................... B65D 33/001 206/554
5,292,093 A * 3/1994 Shumake .............. B65F 1/1415 248/152
5,363,980 A * 11/1994 Mulcahy ................... B65F 1/00 206/554
5,425,468 A * 6/1995 Birkel ................... B65F 1/0006 220/495.11
5,897,084 A * 4/1999 Judge .................. B65B 67/1205 141/390
6,808,073 B2 * 10/2004 Cuisinier ............. B65D 33/001 206/515
7,080,750 B2 * 7/2006 Wein ....................... B65F 1/062 220/495.01
7,168,591 B1 1/2007 Miller
7,811,522 B2 * 10/2010 Mathus ................... B01L 3/505 206/386
8,182,564 B2 * 5/2012 Howard ................. B01D 46/02 55/371
8,342,461 B2 1/2013 Sutphen
(Continued)

*Primary Examiner* — Chun Hoi Cheung
*Assistant Examiner* — Brijesh V. Patel

(57) ABSTRACT

A collapsible container system includes a container having a set of walls interconnected with one another and a bottom member. The walls and the bottom member define a cavity in a first state. A set of bags is in a nested arrangement, and the nested arrangement defines a first bag being contained within a next bag of the set of bags. The first bag is removed through a top opening of the next bag enabling the next bag as a receptacle. A first connector ribbon is disposed near a rim of the container, and the first connector ribbon connects to a perimeter of each of the set of bags via a first connection. A second connector ribbon is disposed at one of the walls of the container, and the second connector ribbon connects to a side of each of the set of bags via a second connection.

18 Claims, 11 Drawing Sheets

(56) References Cited

U.S. PATENT DOCUMENTS

| | | | | |
|---|---|---|---|---|
| 8,807,379 | B1 | 8/2014 | Hammond | |
| 8,887,941 | B2 * | 11/2014 | Heintzman | B65D 25/14 220/495.06 |
| 2002/0121455 | A1 * | 9/2002 | Smith | B65D 33/001 206/554 |
| 2003/0089719 | A1 * | 5/2003 | Berger | B65F 1/06 220/495.07 |
| 2004/0223664 | A1 * | 11/2004 | Martin | B65D 33/001 383/37 |
| 2005/0129335 | A1 * | 6/2005 | Paul | B65F 1/0006 383/11 |
| 2006/0266752 | A1 * | 11/2006 | Scherer | B65F 1/062 220/495.08 |
| 2007/0045326 | A1 * | 3/2007 | Tramontina | B65F 1/0006 220/495.11 |
| 2007/0227924 | A1 | 10/2007 | Ou | |
| 2007/0235455 | A1 * | 10/2007 | Goldberg | B65F 1/062 220/495.07 |
| 2007/0235456 | A1 * | 10/2007 | Tamez | B65F 1/0006 220/495.07 |
| 2007/0257093 | A1 * | 11/2007 | Lott | A47G 7/063 229/117.05 |
| 2012/0291258 | A1 * | 11/2012 | Dominick | B65D 33/001 29/428 |
| 2013/0186900 | A1 * | 7/2013 | Heintzman | B65D 25/14 220/495.07 |
| 2014/0238993 | A1 | 8/2014 | Andersen | |
| 2014/0263532 | A1 * | 9/2014 | Licata | B65H 35/10 225/106 |
| 2017/0088349 | A1 * | 3/2017 | Patel | B65F 1/0006 |

* cited by examiner

FIG. 8A
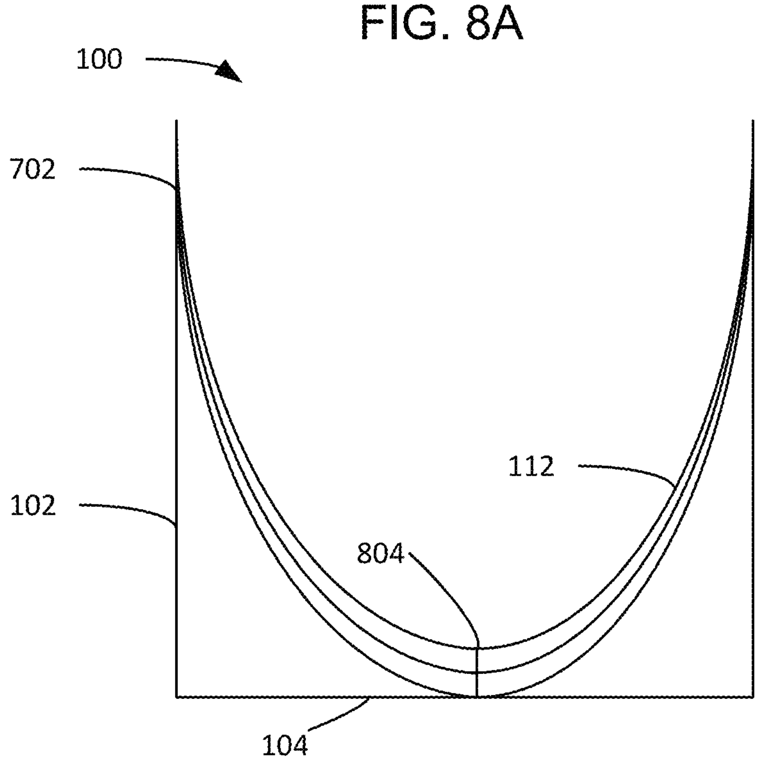
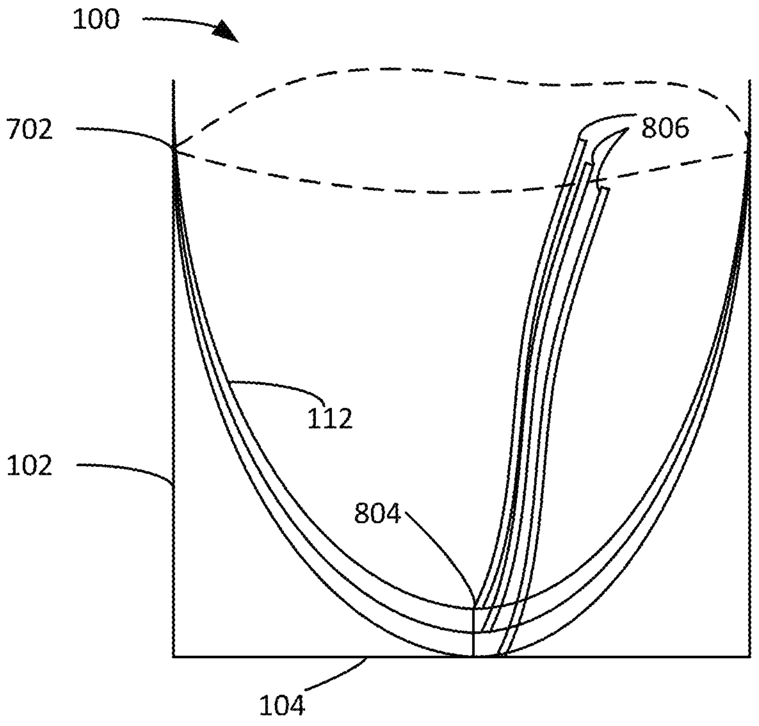
FIG. 8B

COLLAPSIBLE CONTAINER WITH NESTED BAGS

BACKGROUND

Garbage or trash at construction sites have always been a challenge for city sanitary departments. First, construction sites typically don't have trash cans available to collect trash or garbage. Even if there is one, trash collection on construction sites may be difficult because the containers such as make-shift containers or steel oil drums don't hold bags properly at the rim of the containers. The containers may be too large such that making collection of garbage difficult. The containers may also be too heavy to move to empty the contents thereof.

Similarly, other sites such as camp sites, outdoor concerts, weddings, festivals, state fairgrounds, or other events held at public parks, etc., may not have preexisting trash cans or mobilized ones. As such, similar challenges such as those at the construction sites apply.

Therefore, it would be advantageous to provide a different trash collection approach to situations such as the above so that trash collection is easier. It would also be advantageous to have the approaches be environmentally friendly.

SUMMARY

Aspects of the invention attempt to solve the challenges of existing practices by providing a collapsible container with layers of built-in bags inside thereof. The bags are nested or staggered with each of the bags attached to the rim of the container via a tab. A user may remove the top most bag from the remaining bags, upon receiving trash or other items therewithin, by pulling the tab. The removal of the bag may expose a next bag to receive items from the user. In one embodiment, perforations or weakened areas of the bags may be attached to the container in view of tabs. In another embodiment, a set of tags or anchors may be used to secure the bags to a bottom of the container. In such an embodiment, perforations may also be used when connecting the set of tabs or anchors to the bags such that the connection may be severed from the container. In a further embodiment, the collapsible container may be made of cardboard or other durable materials for supporting the bags.

BRIEF DESCRIPTION OF DRAWINGS

FIGS. 8A-8B are cross-sectional views of a collapsible container showing connectors between the bags and the container according to one embodiment of the invention.

Persons of ordinary skill in the art may appreciate that elements in the figures are illustrated for simplicity and clarity so not all connections and options have been shown to avoid obscuring the inventive aspects. For example, common but well-understood elements that are useful or necessary in a commercially feasible embodiment may not often depicted in order to facilitate a less obstructed view of these various embodiments of the present disclosure. It may be further appreciated that certain actions and/or steps may be described or depicted in a particular order of occurrence while those skilled in the art will understand that such specificity with respect to sequence is not actually required. It will also be understood that the terms and expressions used herein are to be defined with respect to their corresponding respective areas of inquiry and study except where specific meanings have otherwise been set forth herein.

DETAILED DESCRIPTION

The present invention now will be described more fully with reference to the accompanying drawings, which form a part hereof, and which show, by way of illustration, specific exemplary embodiments by which the invention may be practiced. These illustrations and exemplary embodiments are presented with the understanding that the present disclosure is an exemplification of the principles of one or more inventions and is not intended to limit any one of the inventions to the embodiments illustrated. The invention may be embodied in many different forms and should not be construed as limited to the embodiments set forth herein; rather, these embodiments are provided so that this disclosure will be thorough and complete, and will fully convey the scope of the invention to those skilled in the art. The following detailed description is, therefore, not to be taken in a limiting sense.

Figure 1:
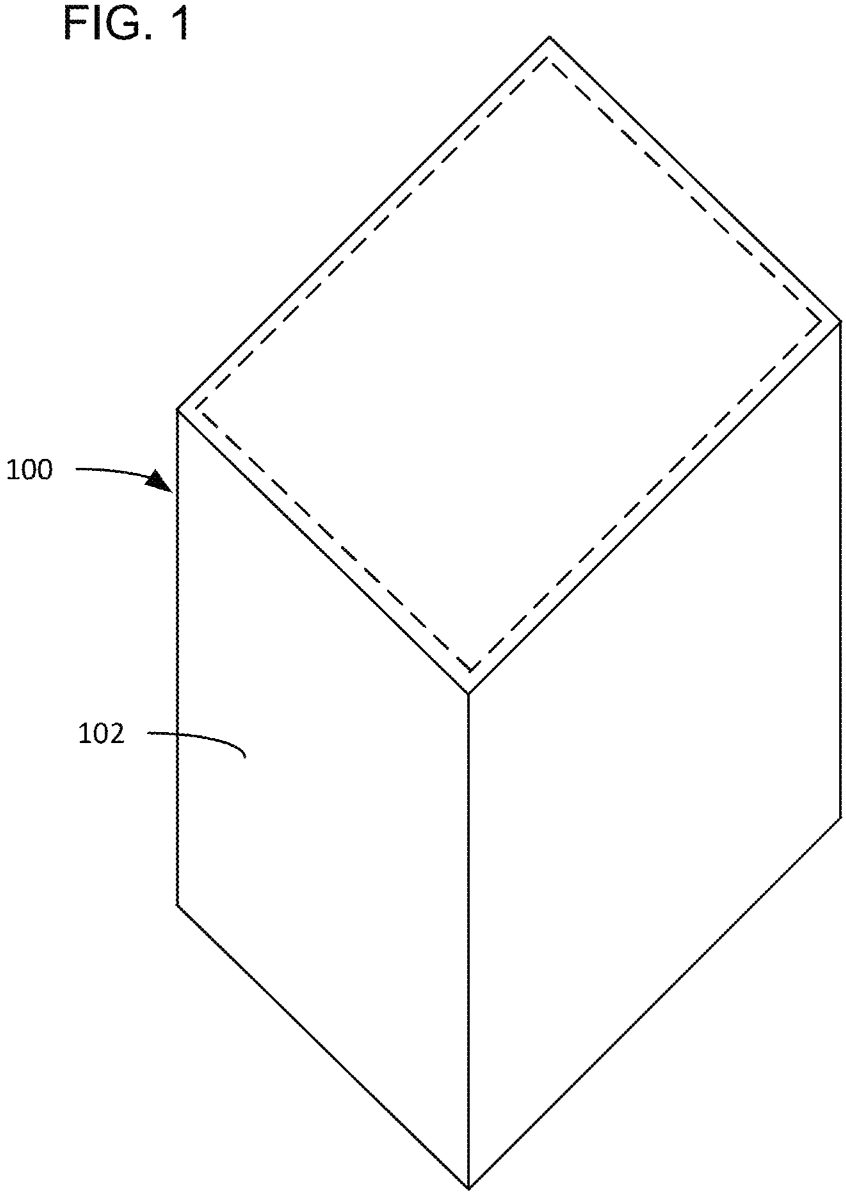
FIG. 1 is a perspective view showing a collapsible container according to one embodiment of the invention.

Embodiments of the invention include a container made from cardboard or another material that is both recyclable and/or collapsible. For example, biodegradable materials may be used. Referring now to FIG. 1, a diagram showing a perspective view of a collapsible container according to one embodiment of the invention. A container 100 may include a shell 102. The shell 102 includes 4 sides or walls with a bottom member 104 (see also FIG. 2). In one embodiment, each of the four sides or walls include four edges with each of the sides of the shell 102 having two edges abutting adjacent side or wall. One of the remaining two edges of each of the four sides are connected to the bottom member 104.

Figure 2:
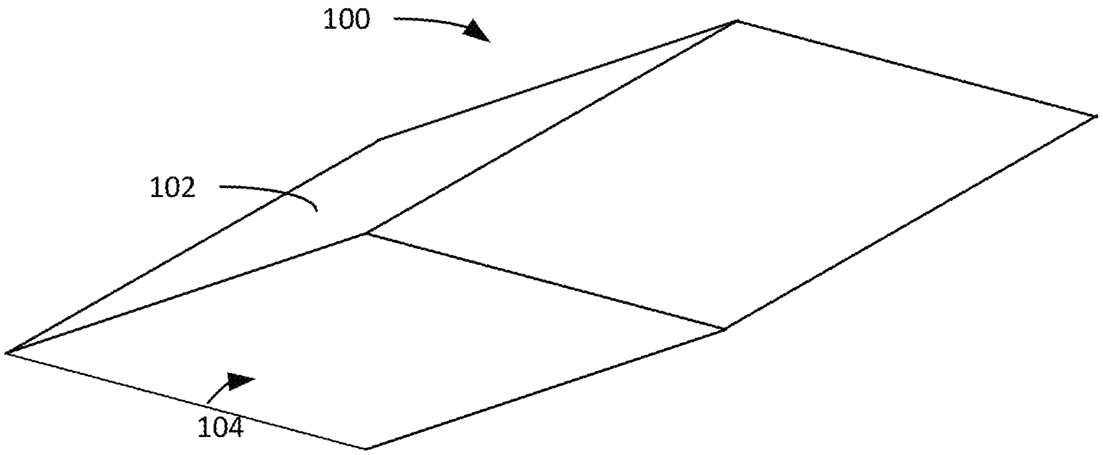
FIG. 2 is a perspective view showing a collapsible container not in a fully collapsed state according to one embodiment of the invention.
Figure 5:
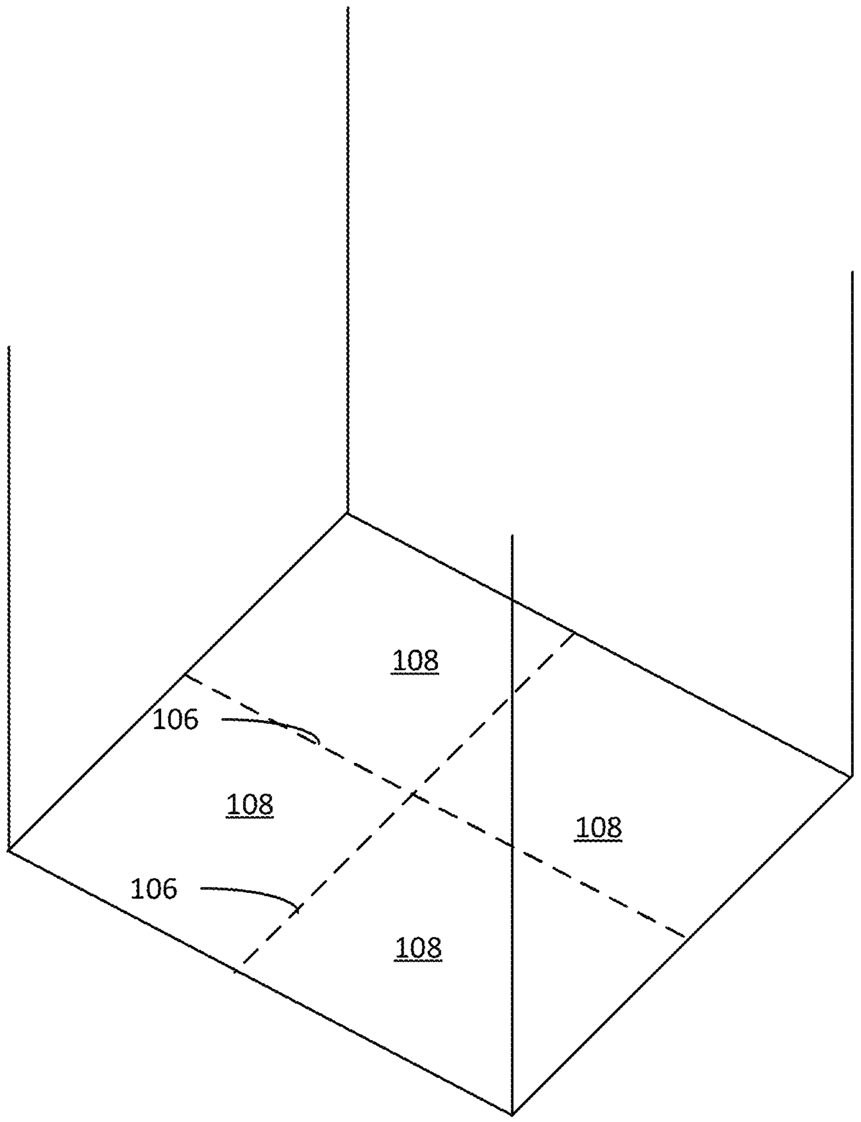
FIG. 5 is a bottom view of a collapsible container showing interlocking panels to collapse or construct the container according to one embodiment of the invention.
Figure 6A:
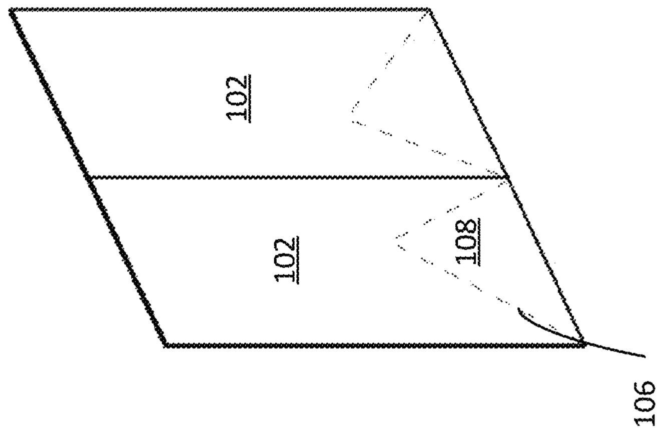
FIGS. 6A-6B illustrate diagrams showing opening and collapsing of the container according to one embodiment of the invention.
Figure 6B:
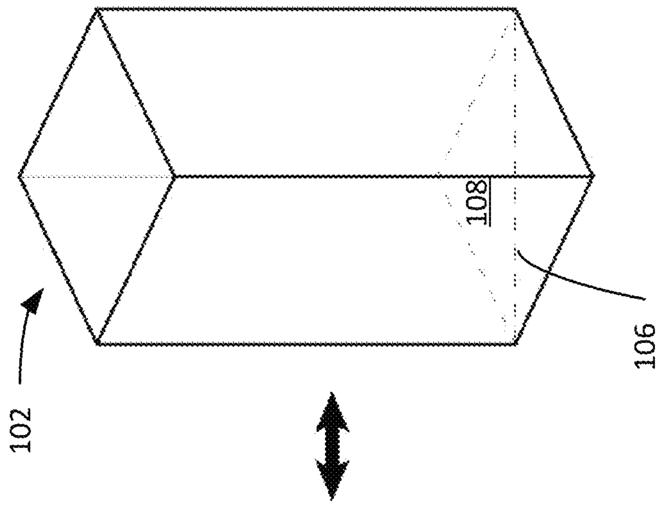

In one embodiment, the bottom member 104 includes grooves or dents for collapsing the bottom member 104 and for folding the four sides or walls. For example, the container 100 as shown in FIG. 1 may be in an assembled or a first state. In this state, the container 100 may be ready to be used with a plurality of bags engaged therewith. In FIG. 2, the container 100 may be in a transitional state where the container 100 is between the assembled/first state and a collapsed or second state. Referring now to FIGS. 5-6, diagrams illustrating connections 106 in the bottom member 104 for transitioning the container from the assembled or first state to the collapsed or second state. In one embodiment, the bottom member 104 may be formed by a number of panels 108 interconnected by connections 106. For example, the connections 106 may be disposed diagonally on the bottom member 104. In one embodiment, the connections 106 may be a set of interlocking joints connecting the panels 108. In another embodiment, the connections 106 enable the panels 108 to rotate about an axis of the connections 106 such that the panels 108 may transition from an Y plane to an X plane, as illustrated in FIG. 6A. Inversely, the connections 106 enable the panels to transition from the X plane to the Y plane to transition from the collapsed or second state to the assembled or first state in FIG. 6B.

Figure 3:
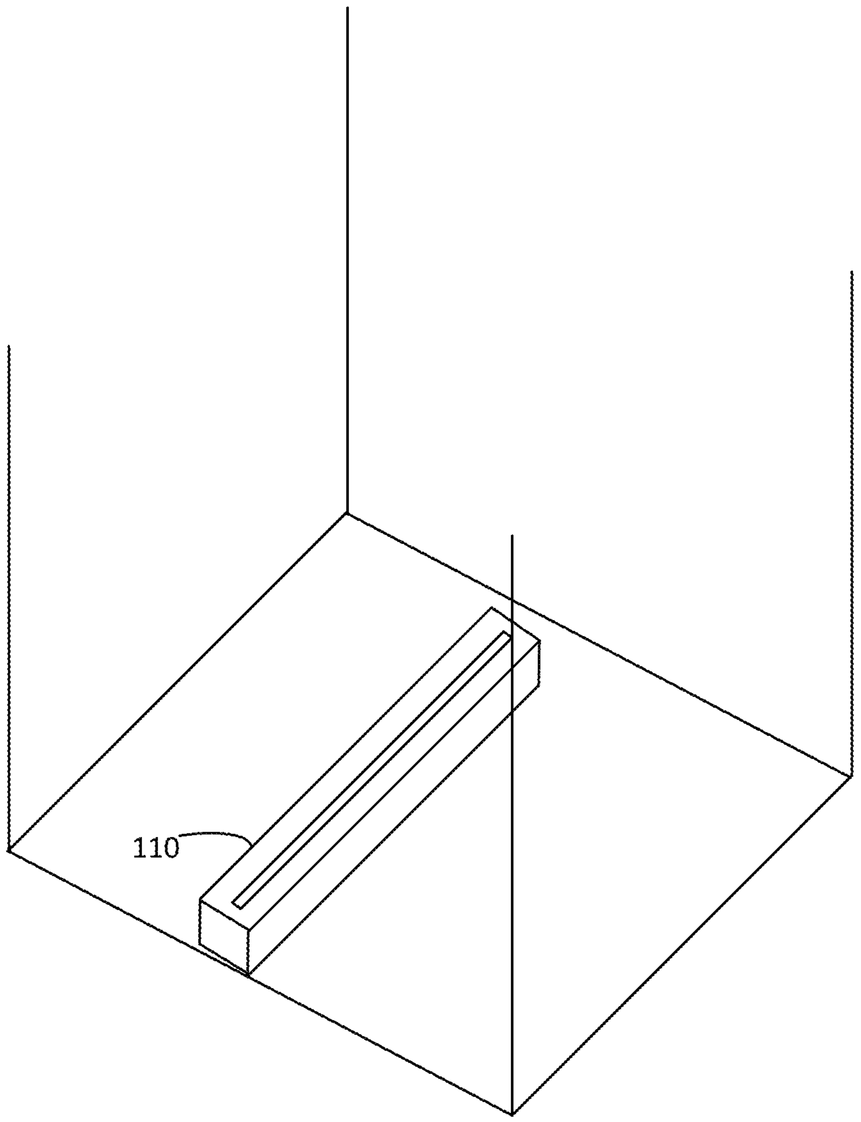
FIG. 3 is a perspective view showing a roller with bags according to one embodiment of the invention.
Figure 4:
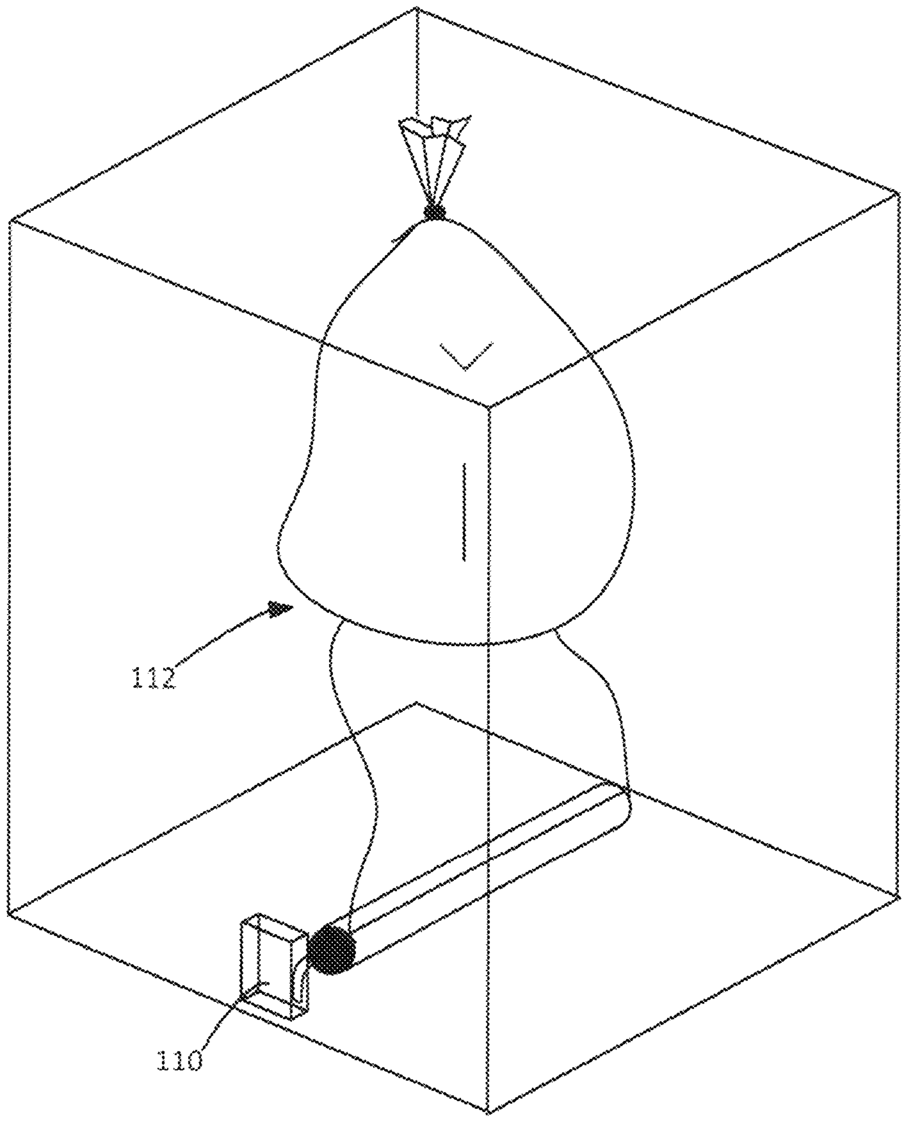
FIG. 4 is a perspective view showing a roller with bags according to another embodiment of the invention.

Referring now to FIGS. 3-4, diagrams illustrate a set of bags 112 to be drawn from the container 100. In one embodiment, the set of bags 112 may be drawn from a roller 110. In one example, the set of bags 112 are disposed in a nested arrangement where a topmost bag is contained within a next bag of the set of bags 112. The roller 110 may be disposed at the bottom member 104. In another embodiment, the roller 110 may be an external to the container 100 and may be attached to the bottom member 104 after the container 100 is in the assembled or first state. In one embodiment, the set of bags 112 are nested in the roller 110 and may be drawn up in a sequential manner as shown in FIG. 4. In another embodiment, FIGS. 7-11 illustrate embodiments of how the set of bags 112 may be removed once a topmost one of the bags 112 has received items.

Figure 7:
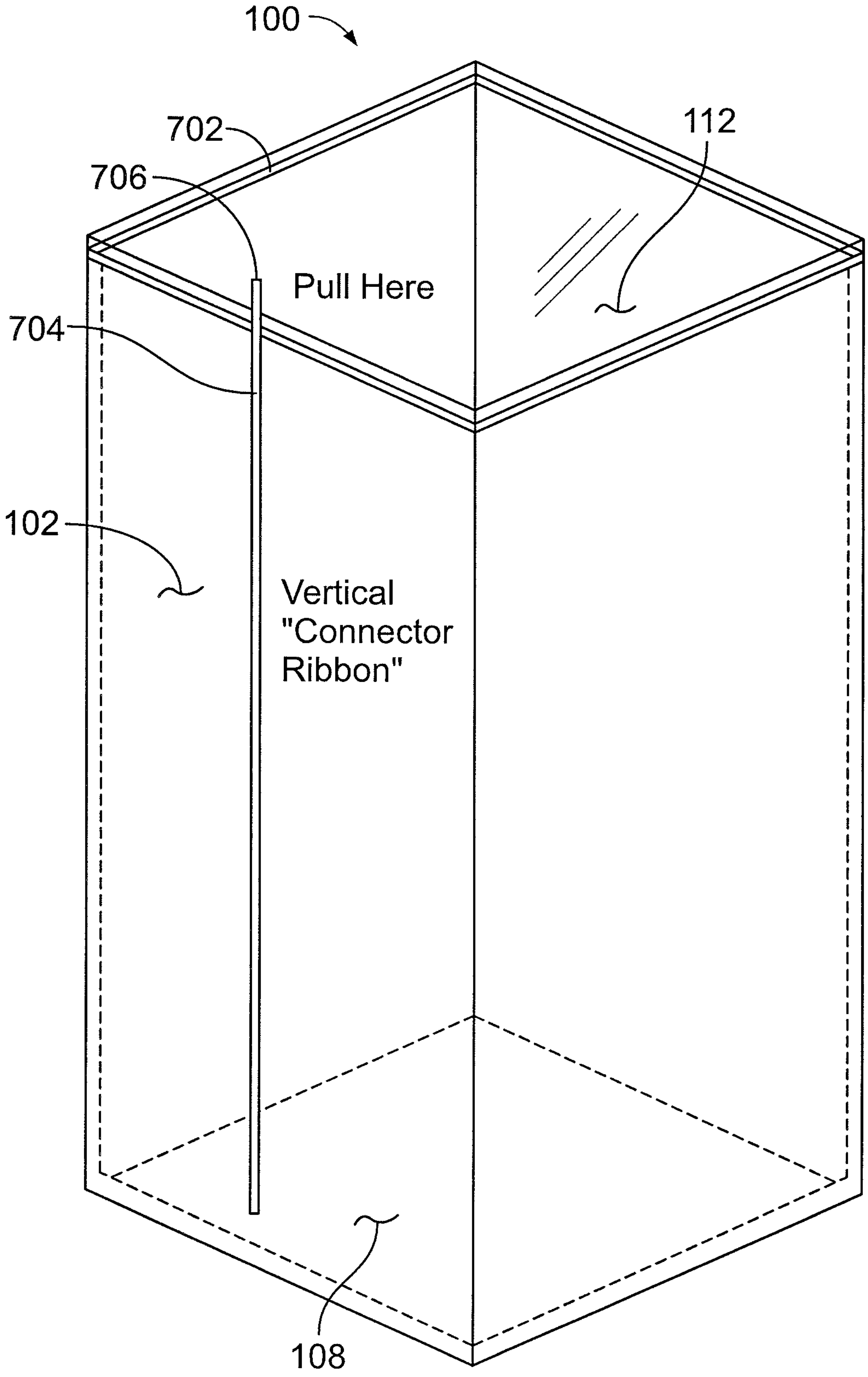
FIG. 7 is a perspective view of a collapsible container showing connectors between the bags, the container and the tab according to one embodiment of the invention.

Referring now to FIG. 7, the container 100 may include a first connector ribbon 702 near the rim of the top edge of each of the sides or walls 102. For example, the first connector ribbon 702 may be an adhesive connecting a part of each of the bags 112 (not shown in FIG. 7) to an interior surface of one of the four sides or walls of the container 100. In one embodiment, the first connector ribbon 702 may be a strip attaching or engaging the perimeter, lip or rim of each of the bags 112. In one aspect, the perimeter, lip or the rim of each of the bags 112 may connect with the first connector ribbon 702 and this connection with the first connector ribbon 702 may be severed. In one example, the connection with the first connector ribbon 702 may be with perforations or a weakened portion near or disposed at the perimeter, lip or rim of each of the bags 112. The connection may be relatively easy to be broken such that a user may remove the topmost bag from the set of bags 112.

Figure 9:
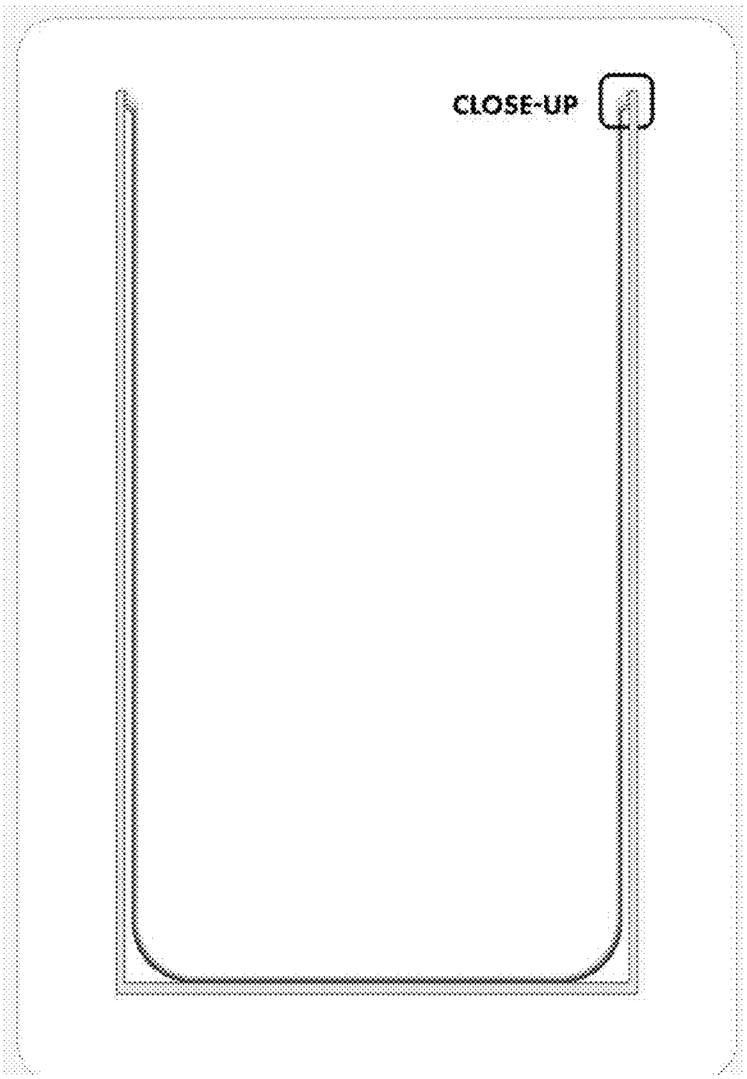
FIG. 9 is cross-sectional view of a collapsible container showing connectors between the bags and the container according to another embodiment of the invention.
Figure 10:
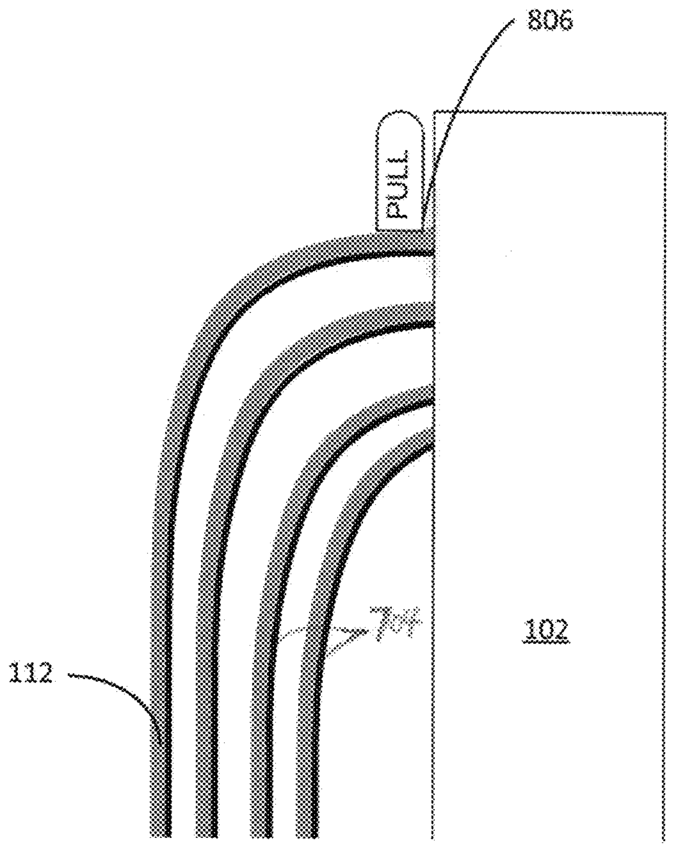
FIG. 10 is cross-sectional view of a tab connecting each of the bags and to the container according to one embodiment of the invention.
Figure 11:
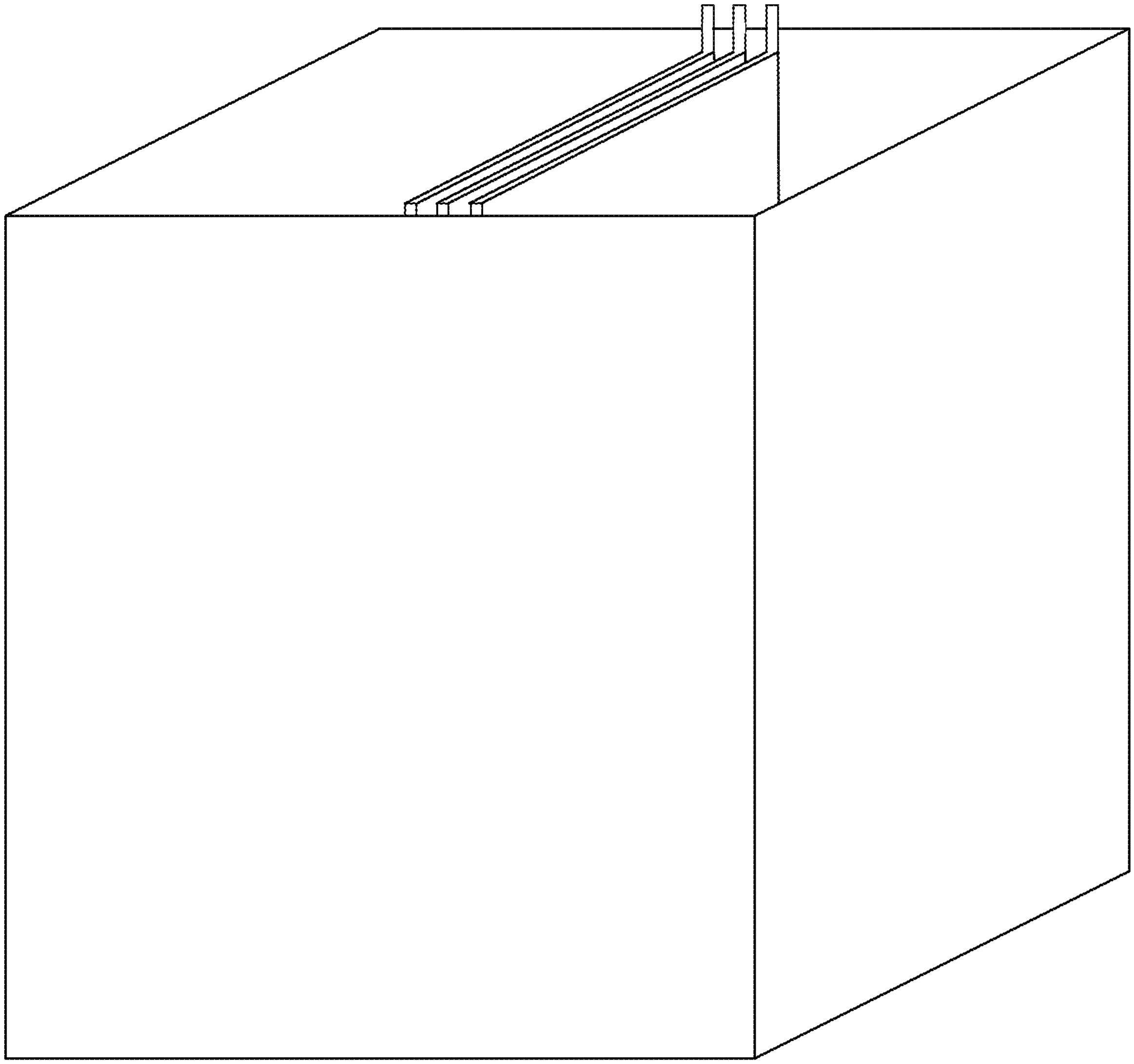
FIG. 11 is a perspective view of a collapsible container showing connectors between the bags and the container according to another embodiment of the invention.

At the same time, aspects of the invention solve the challenges of drawing only just the topmost bag and not a number of bags from the set of bags 112. For example, the container 100 may further include a second connector ribbon 704, and each of the bags 112 includes one of a plurality of second connector ribbons 704. Each second connector ribbon 704 may include a tab 706 to be pulled by the user to aid the removal of the topmost bag. In one example, the second connector ribbon 704 is disposed in an interior surface of one of the four sides or walls 102, and on an external surface of each bag. The second connector ribbons 704 may be disposed vertically down the side of each of the bags 112 and the container 100 serving as a way to keep the bags 112 together while the topmost bag is pulled out or removed from the rest of the bags 112. As one would anticipate, such removal would create a suction force that would draw out other bags, including the one that is immediately following the topmost bag. As such, each of the bags 112 is engaged with or connected to an adjacent bag via one of a plurality of second connector ribbons 704. This connection, similar to those to the first connector ribbon 702, may be in the form of perforations or a weakened portion. Therefore, as the user pulls the tab 706, the force of such action may initiate the tearing of both the first connector ribbon 702 and the second connector ribbon 704. This enables the topmost bag to be pulled out or separated from the set of bags 112 with ease, revealing the next open bag ready for use. FIGS. 9 and 10 further illustrate one such embodiment of the invention.

In one embodiment, the first connector ribbon 702 and the second connector ribbon 704 may be disposed at the same side or wall of the container 100. In another embodiment, as shown in FIG. 8A, the second connector ribbon 804 may be disposed at the bottom member 104. As illustrated, FIG. 8A shows a cross-section of the container 102 showing the second connector ribbon 804 and locations of the first connector ribbon 702. In particular as shown in FIG. 8B, tabs 806 may be used as connected to or near the second connector ribbon 804.

According to one embodiment of the invention, a user may practice or apply aspects of the invention as follows. Initially, the container 100 may be in the collapsed or second state as seen in FIG. 6A. The user may then, according to the connections 106, apply forces to edges of the sides or walls 102 such that the sides or walls 102 unfold from the collapsed or second state to the assembled or first state, as shown in FIG. 6B. As the container 100 transitions from the collapsed or second state to the assembled or first state, the set of bags 112 may also expand or open. Inside the container, the topmost bag of the set of bags 112 may expose its opening to the user such that the user may immediate deposit items in the topmost bag through its opening. Once the user wishes to remove the topmost bag from the remaining set of bags 112 from the container 100, the user may sever the first connection and the second connection—connections holding the topmost bag to the container and the remaining bags. The user may pull the tab to pull the topmost bag. Upon severing the first connection and the second connection, the topmost bag may be removed and an opening of the next bag is ready for the user to deposit items. As the set of bags are in the nested arrangement as described above, another bag after the next bag will expose its opening to the user once the next bag is removed. Once all the bags in the set of bags 112 are removed, the user may then fold the container to transition from the assembled or first state to the collapsed or second state. In one embodiment, the container 100 may be made of recyclable or environmentally friendly materials such that the folded container with no bags may be recycled.

Upon reading this disclosure, those of skill in the art will appreciate still additional alternative structural and functional designs for the systems and methods described herein through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the systems and methods disclosed herein without departing from the spirit and scope of the invention.

What is claimed is:

1. A collapsible container system comprising:

a container having a set of walls interconnected with one another and a bottom member, said set of walls and the bottom member defining a cavity in a first state;

a set of bags in a nested arrangement, said nested arrangement defining a first bag being contained within a next bag of the set of bags, and the first bag being removed through a top opening of the next bag enabling the next bag as a receptacle;

a first connector ribbon disposed on an interior of the set of walls near a rim of the container, said first connector ribbon connecting to a perimeter of each of the set of bags via a first connection;

a second connector ribbon disposed at one of the set of walls of the container, a plurality of multiple additional connector ribbons seperably connecting to a side of each of the set of bags and to said second connector ribbon; and wherein the first bag is removed in response to severing of the first connection and releasing one of said multiple additional connector ribbons from said second connector ribbon.

2. The collapsible container system of claim 1 wherein the set of walls comprises four.

3. The collapsible container system of claim 1 wherein the bottom member comprises diagonal connections for defining one or more panels thereof, said diagonal connections rotatably adjusting the one or more panels from an Y plane to an X plane as the container transitions from the first state to a second state.

4. The collapsible container system of claim 3 wherein the diagonal connections rotatably adjust the one or more panels from the X plane to the Y plane as the container transitions from the second state to the first state.

5. The collapsible container system of claim 3 wherein the diagonal connections comprise a set of interlocking joints connecting the one or more panels.

6. The collapsible container system of claim 1 wherein the first connection comprises a set of perforations.

7. The collapsible container system of claim 1 wherein the second connection and the plurality of multiple additional connector ribbons comprises a set of perforations.

8. The collapsible container system of claim 1 wherein the second connection and the plurality of multiple additional connector ribbons comprises a combination of a tab and a set of perforations.

9. A nested receptacle system comprising:

a container having a set of walls interconnected with one another and a bottom member, said set of walls and the bottom member defining a cavity in a first state;

a set of receptacles in a nested arrangement, said nested arrangement defining a first receptacle being contained within a next receptacle of the set of receptacles, and the first receptacle being removed through a top opening of the next receptacle;

a first connector ribbon disposed on a first interior surface of the container, said first connector ribbon connecting to a perimeter of each of the set of receptacles via a first connection;

a second connector ribbon disposed on a second interior surface of the container, a plurality of multiple additional connector ribbons seperably connecting to a side of each of the set of receptacles via a second connection; and wherein the first receptacle is removed in response to severing of the first connection and one of the plurality of said multiple additional connector ribbons from said second connector ribbon.

10. The nested receptacle system of claim 9 wherein the bottom member comprises diagonal connections for defining at least one panel, said diagonal connections rotatably adjusting the at least one panel from an Y plane to an X plane as the container transitions from the first state to a second state.

11. The nested receptacle system of claim 10 wherein the diagonal connections rotatably adjust the at least one panel from the X plane to the Y plane as the container transitions from the second state to the first state.

12. The nested receptacle system of claim 10 wherein the diagonal connections comprise a set of interlocking joints connecting the adjacent panels.

13. The nested receptacle system of claim 9 wherein the first connection comprises a set of perforations.

14. The nested receptacle system of claim 9 wherein the second connector ribbon and the plurality of multiple additional connector ribbons comprise a set of perforations.

15. The nested receptacle system of claim 9 wherein the second connector ribbon and the plurality of multiple additional connector ribbons comprise a combination of a tab and a set of perforations.

16. The nested receptacle system of claim 9 wherein the first connector ribbon is disposed on the first interior surface near a rim of the container.

17. The nested receptacle system of claim 9 wherein the second connector ribbon is disposed on the second interior surface of one of the set of walls of the container.

18. The nested receptacle system of claim 9 wherein the second connector ribbon is disposed on the second interior surface of the bottom member of the container.

* * * * *